March 27, 1956  W. R. GRAHAM, JR  2,739,522
APPARATUS FOR DEAERATING AND STORING OXIDIZABLE MATERIAL
Filed April 12, 1952  3 Sheets-Sheet 1

INVENTOR.
William R. Graham, Jr.
BY
ATTORNEY.

March 27, 1956 W. R. GRAHAM, JR 2,739,522
APPARATUS FOR DEAERATING AND STORING OXIDIZABLE MATERIAL
Filed April 12, 1952 3 Sheets-Sheet 2

INVENTOR.
William R. Graham, Jr.
BY
Thos. E. Scofield
ATTORNEY.

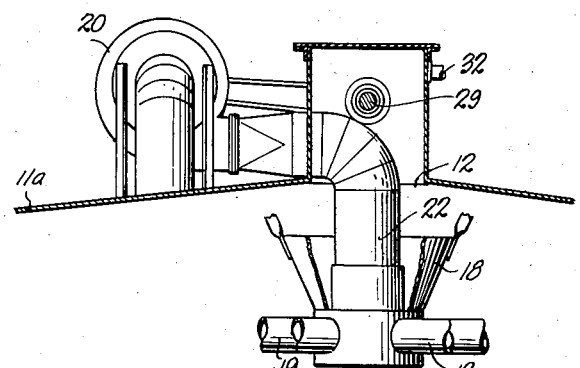
Fig. 5.
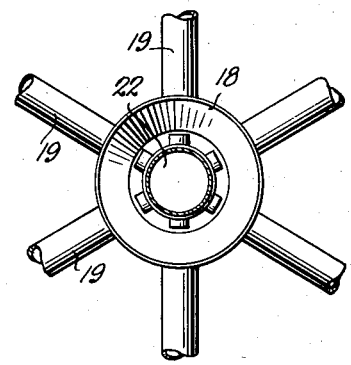
Fig. 6.
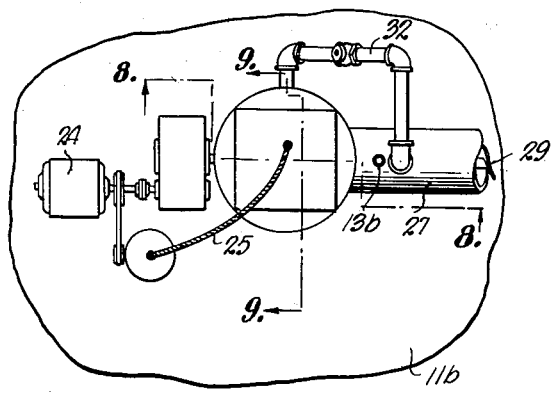
Fig. 7.
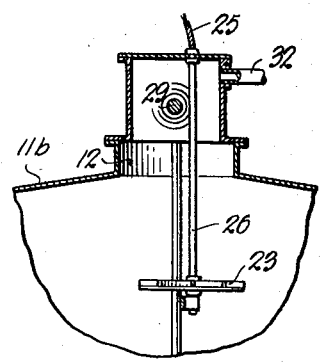
Fig. 9.
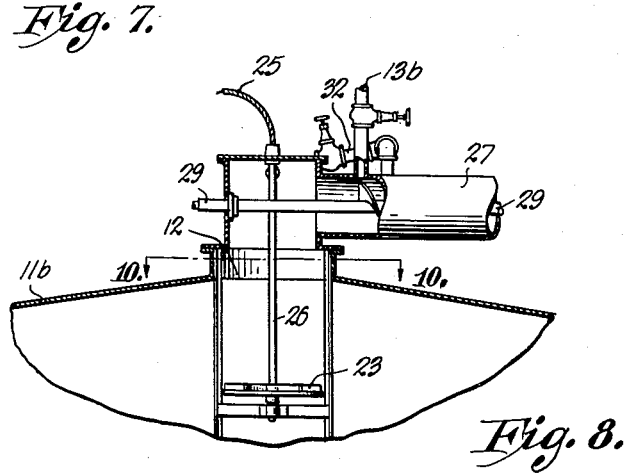
Fig. 10.
Fig. 8.
INVENTOR.
William R. Graham, Jr.
BY
ATTORNEY.

United States Patent Office 2,739,522
Patented Mar. 27, 1956

2,739,522

APPARATUS FOR DEAERATING AND STORING OXIDIZABLE MATERIAL

William R. Graham, Jr., Wilmette, Ill., assignor, by mesne assignments, to National Alfalfa Dehydrating & Milling Company, Lamar, Colo., a corporation of Delaware Application April 12, 1952, Serial No. 281,962

17 Claims. (Cl. 99—271)

This invention relates to apparatus for deaerating and storing material in storage tanks, and more particularly to apparatus for deaerating and storing oxidizable material in storage tanks filled with non-oxidizing gas.

This application is a continuation in part of application Serial No. 578,506 filed February 17, 1945, now Patent No. 2,617,351, issued November 11, 1952.

In charging oxidizable material into storage tanks filled with non-oxidizing gas, it is difficult to evenly distribute the material in the tank without subjecting it to contact with the air. Likewise, when charging a series of tanks from a single source of material, or from a distant source of material, a serious problem is where to properly deaerate the material to avoid subsequent contamination. As the storage tank is filled, a method of releasing excess gas from the tank must be provided. Other problems are the efficient disposal of the contaminated gas after the deaerating process and the arrangement of the deaerating apparatus so the contaminated gas does not enter the storage tank with the material.

An important object, therefore, of the invention is to provide an apparatus for evenly distributing the material in the tank without subjecting it to oxidizing contact with the air.

A further object is to provide an apparatus to release excess gas from the storage tank as the tank is filled.

Further objects are the efficient disposal of the contaminated gas after the deaerating process and the arrangement of the deaerating apparatus so the contaminated gas does not enter the storage tank.

Other and further objects of the invention, together with additional features of novelty by which the objects are achieved, will appear in the course of the following description.

In the accompanying drawings which form a part of the specification and are to be read in conjunction therewith, and in which like reference numerals are employed to indicate like parts of the various views:

Fig. 5 is a view taken along the lines 5—5 of Fig. 4 in the direction of the arrows;

Fig. 6 is a view taken along the lines 6—6 of Fig. 3 in the direction of the arrows;

Fig. 7 is a top view of a modified form of spreading mechanism;

Fig. 8 is a view taken along the lines 8—8 in Fig. 7 in the direction of the arrows;

Fig. 9 is a view taken along the lines 9—9 in Fig. 7 in the direction of the arrows; and Fig. 10 is a view taken along the lines 10—10 in Fig. 8 in the direction of the arrows.

Figure 1:
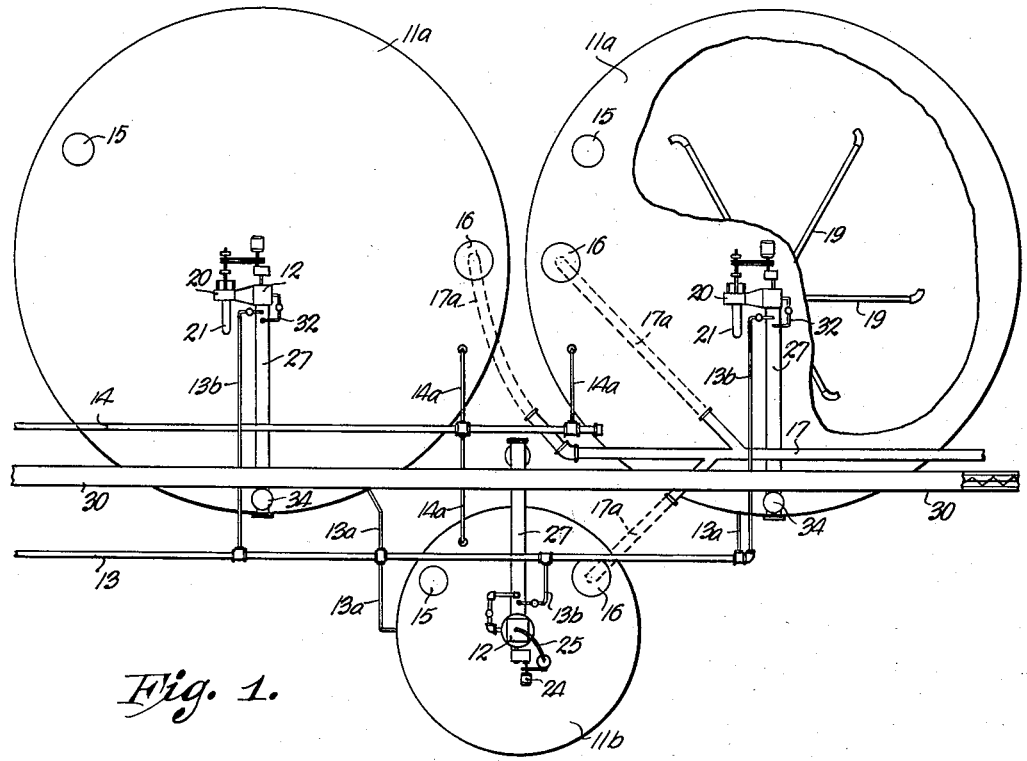
Fig. 1 is a plan view of a series of storage tanks and conveyor assemblies embodying the invention.
Figure 2:
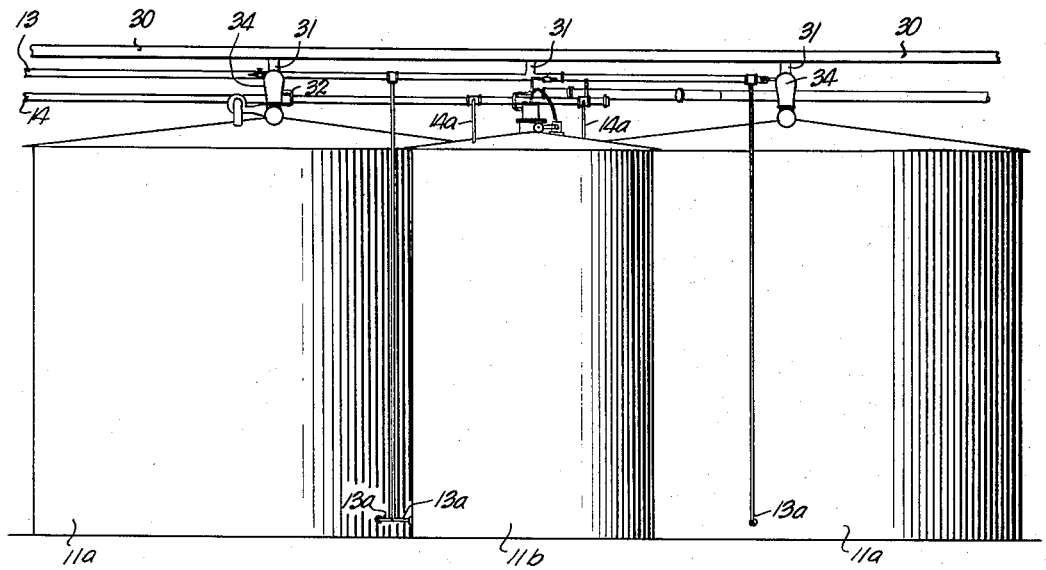
Fig. 2 is a side view of the apparatus in Fig. 1.
Figure 3:
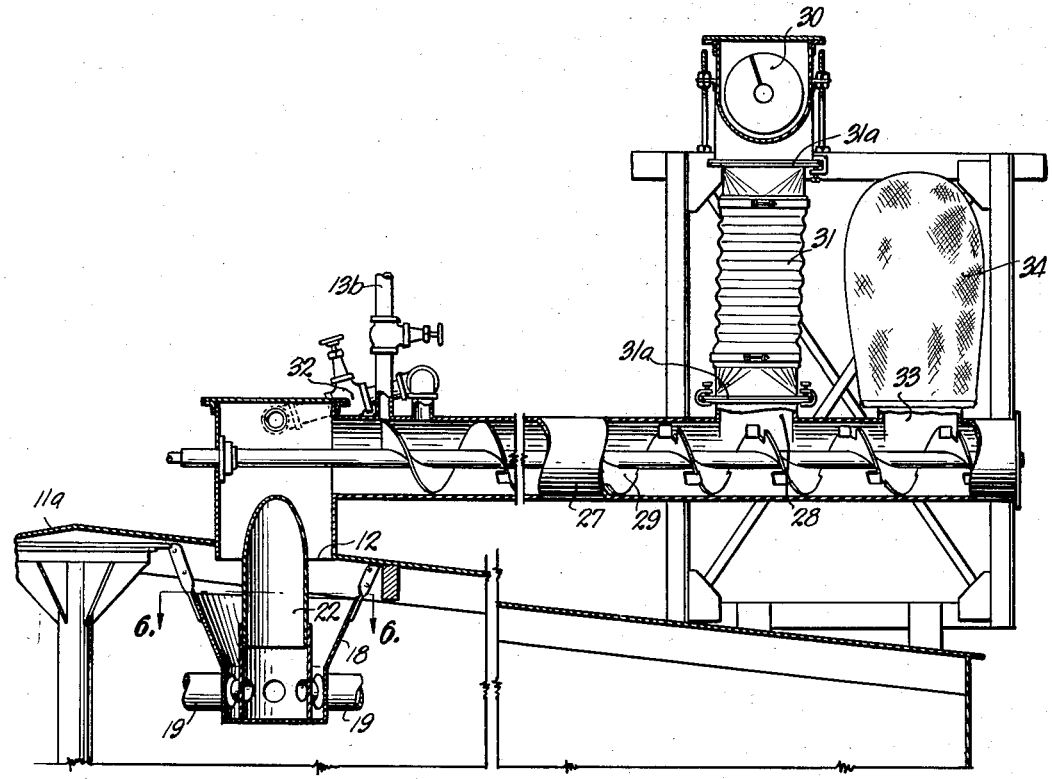
Fig. 3 is a sectional side view of a deaerating conveyor on the top of one of the storage tanks showing a preferred form of spreading mechanism in the storage tank.
Figure 4:
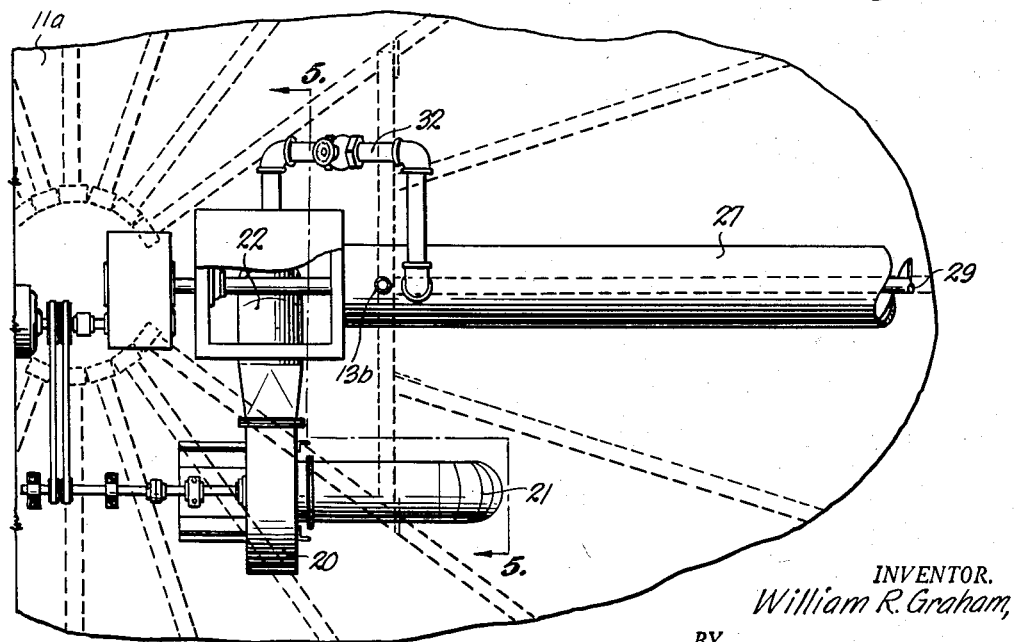
Fig. 4 is a plan view of the conveyor shown in Fig. 3.

In the drawings, the numerals 11a and 11b designate air-tight storage tanks, each having a top inlet 12 for the introduction of material to be stored.

Gas line 13 is a relatively high-pressure source of non-oxidizing gas having connections 13a to the bottoms of the tanks and connections 13b to the deaerating passageways 27 on the tops of the tanks. Gas line 14 is a relatively low-pressure source of non-oxidizing gas having connections 14a to the tops of the tanks.

A combination pressure and vacuum relief valve 15 is positioned on the top of each tank. Material removal ports 16 are positioned on the tops of the tanks rendering them accessible to flexible suction lines 17a attached to vacuum line 17.

A preferred form of device employed to obtain an even distribution of the material within the storage tank, for use in the larger size tanks 11a, comprises a hopper 18 with a bottom closure positioned below the inlet 12 and adapted to receive material from the inlet, spreader arms 19 extending radially from the base of the hopper 18 and a blower 20 having a suction connection 21 into the top of the tank, and a discharge connection 22 into the hopper 18.

An alternate form of device for spreading material, used in small storage tanks 11b, comprises a power-driven disk 23, located below the inlet 12. Disk 23, as shown in Figs. 7 and 8, is driven by a motor 24 through flexible cable 25 and shaft 26, extending through inlet 12.

Above the storage tanks 11a and 11b are positioned enclosed passageways 27, communicating at one end with the tanks and having near their other ends openings 28 through which material to be stored is introduced. Conveyors 29 in passageways 27 are operative to move the material continuously from the openings 28 into the tanks. A source of non-oxidizing gas under pressure has connections 13b to said passageways 27 at points remote from said openings 28. Conveyors 29 terminate short of the tank ends of passageways 27 to permit the formation of a plug of material at the point.

A primary conveyor 30 may be used to feed the material to be stored into the enclosed passageways or secondary conveyors 27. Flexible couplings 31 are used to connect said primary conveyor 30 with the openings 28 of the secondary conveyors 27. Gates 31a are positioned at the junctures of said conveyor 30 and said couplings and the couplings and the passageways to permit closing off of the couplings and passageways.

A pressure-equalizing duct 32 connects the storage tanks 11a and 11b with the enclosed passageways 27 at points between the gas introduction connections 13b and the openings 28.

Gas discharge openings 33 from passageways 27 to the atmosphere are positioned on the opposite sides of the openings 28 from the storage tanks. Solids-retaining filters 34 cover said gas discharge openings to prevent any escape of the material.

In operation the air is first flushed from the tanks by non-oxidizing gas from the relatively high-pressure gas line 13. The gas is introduced through connections 13a and the air comes out of the valves 15. When the proper non-oxidizing atmosphere has been established, the high-pressure connections 13a are shut off and the desired pressure in the tanks is maintained from the relatively low-pressure line 14 through connections 14a.

The material to be stored is then introduced into the primary conveyor 30 through which it is moved until it reaches the couplings 31 connecting said primary conveyor to the enclosed passageways or secondary conveyors 27. If the gates 31a are open the material descends through coupling 31 and opening 28 into passageway 27, where it is moved through the passageways by conveyor means 29 toward the inlets 12 of the tanks. In the meantime, non-oxidizing gas is introduced from the relatively high-pressure line 13 through connections 13b into passageways 27 where it is passed counterflow to the motion of the material to be stored; thus removing any air present with the material. Some of the gas finds its way through couplings 31 and primary conveyor 30 which are not made airtight, but the greater portion of it is discharged through gas discharge openings 33. The solids-retaining filters 34 prevent any loss of the material with the gas.

The material on reaching the tank ends of passageways 27 form plugs which prevent any release of displaced gas from the tanks as they fill, and also any flow of the non-oxidizing gas introduced through connections 13b other than that passing counterflow the material in the secondary passageways. The material being charged into larger storage tanks 11a falls into the hoppers 18 from where it is blown out through the spreader arms 19 by the action of blowers 20. Thus, any contamination of the material by air in the spreading process is avoided.

Material being charged into a smaller storage tank 11b falls onto the power-driven disk 23 located below the tank inlet 12, which, by a centrifugal spinning action, uniformly distributes the material throughout the tank. As shaft 26 is driven by cable 25 through a sealed connection, this spreading device also avoids contamination of material by air during the spreading process.

As the tanks are filled, the non-oxidizing gas which originally filled the tanks and is to make up the storage atmosphere of the tanks, is displaced by the material supplied to the tanks. As the plug of material in the tank ends of the passageways 27 prevents escape of the gas at that point, pressure equalizing ducts 32 are utilized to permit escape of the excess gas. This displaced gas thus aids in the deaerating process and a relatively constant gas pressure is maintained in the tanks during the filling process.

To remove the stored material from the tanks a flexible suction line 17a attached to vacuum line 17 may be inserted into the material through removal port 16. If it is desired to maintain the gaseous atmosphere in the tank, non-oxidizing gas in quantities equivalent to the amount of material removed may be introduced into the tank from the gas lines.

Thus, an apparatus has been provided to deaerate oxidizable material and evenly distribute it within storage tanks in which a non-oxidizing atmosphere is maintained. The material may be stored indefinitely in this manner without deterioration or removed at any time as desired without disturbing the atmosphere.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for charging and storing material subject to deterioration by oxidation, comprising a substantially gas-tight storagetank, an enclosed passageway communicating at one end with the tank and having near the other end an inlet opening for the material, conveyor means within the passageway operative to move the material continuously through the passageway from the inlet opening toward the tank, said conveyor means terminating short of the tank end of the passageway and a portion of the passageway beyond the conveyor being generally horizontal to permit the formation of a plug of material in the passageway immediately ahead of the tank, the end of the passageway communicating with the tank being unobstructed whereby the plug is formed solely by the inertia and unobstructed aggregation of the material to be stored, and a source of non-oxidizing gas under pressure connected to the passageway in the region of said plug, whereby said gas is adapted to flow toward the inlet opening counter-current to the material advancing toward the tank.

2. Apparatus as in claim 1 having a pressure equalizing duct, the opposite ends of said duct being connected to said passageway on the opposite sides of said plug.

3. Apparatus as in claim 1 wherein said passageway has a gas discharge opening to the atmosphere, and said inlet opening for the material is disposed intermediate the gas discharge opening and the point at which said source of non-oxidizing gas is connected to the passageway.

4. Apparatus as in claim 3 having a solids retaining filter covering the gas discharge opening.

5. Apparatus for charging and storing fluent material that is subject to deterioration by oxidation, comprising a substantially gas-tight storage tank having a restricted opening in the top thereof, a generally horizontal tubular conduit having one end positioned above said opening in vertically spaced relation thereto, an upright duct connecting said one end of the conduit to said opening and forming a gas-tight vertical passageway between the conduit and tank, said conduit having at a point remote from said one end an inlet opening for the material to be stored, a screw conveyor in said conduit for advancing material from said inlet toward said vertical duct, said conveyor terminating short of said duct and said conduit having a plug forming zone intermediate the duct and the terminus of the conveyor, the end of the conduit communicating with the duct being unobstructed whereby the plug is formed solely by the inertia and unobstructed aggregation of the material to be stored, a source of non-oxidizing gas under pressure connected to said tank, and a gas by-pass line having one end connected to said vertical passageway and the other end connected to said conduit ahead of the plug forming zone.

6. Apparatus as in claim 5 wherein said by-pass line contains a shut-off valve.

7. Apparatus as in claim 5 having an independent source of non-oxidizing gas under pressure connected to said conduit ahead of said plug forming zone.

8. Apparatus as in claim 5 having power-operated spreader means below the restricted opening in the top of said tank for distributing the material laterally relative to said opening.

9. Apparatus as in claim 8 wherein said spreader means comprises a rotary disk turning about a vertical axis.

10. Apparatus as in claim 1 having spreader means below the restricted opening in the top of said tank for distributing the material laterally relative to said opening.

11. Apparatus as in claim 10 wherein said spreader means comprises a rotary disk power driven and turning about a vertical axis.

12. Apparatus as in claim 1 including means for continuously feeding the material to be stored into the inlet opening of the enclosed passageway.

13. Apparatus as in claim 5 wherein said conduit has a gas discharge opening to the atmosphere, and said inlet opening for the material is disposed intermediate the gas discharge opening and the tank.

14. Apparatus as in claim 13 having a solids retaining filter covering the gas discharge opening.

15. Apparatus for charging and storing material subject to deterioration by oxidation, comprising a substantially gas-tight storagetank, an enclosed passageway communicating at one end with the tank and having near the other end an inlet opening for the material, conveyor means within the passageway operative to move the material continuously through the passageway from the inlet opening toward the tank, said conveyor means terminating short of the tank end of the passageway and a portion of the passageway beyond the conveyor being generally horizontal so as to permit the formation of a plug of material in the passageway immediately ahead of the tank, the end of the passageway communicating with the tank being unobstructed whereby the plug is formed solely by the inertia and unobstructed aggregation of the material to be stored, a source of non-oxidizing gas at superatmospheric pressure, means including a gas connection from said source to said tank for establishing and maintaining an atmosphere of said gas in said tank, and pressure release valves mounted on said tank independent of said tank-passageway communication.

16. Apparatus as in claim 15 including a gas line from said source connected to said passageway ahead of the plug forming zone thereof but behind the intake opening thereof, whereby said gas flows through part of said passageway countercurrent to the flow of material.

17. Apparatus as in claim 15 having spreader means below the opening in the top of said tank for distributing the material laterally relative to said opening as said material arrives from said passageway.

References Cited in the file of this patent

UNITED STATES PATENTS

| | | |
|---|---|---|
| 1,563,206 | Longenecker | Nov. 24, 1925 |
| 1,737,090 | Meyers | Nov. 26, 1929 |
| 1,763,396 | Howland | June 10, 1930 |
| 2,184,248 | Bonotto | Dec. 19, 1939 |
| 2,321,015 | Davis | June 8, 1943 |
| 2,351,853 | Graham | June 24, 1944 |
| 2,480,146 | Lee | Aug. 30, 1949 |
| 2,489,925 | Omwake | Nov. 29, 1949 |